United States Patent [19]

Maltby et al.

[11] 4,235,106
[45] Nov. 25, 1980

[54] SYSTEM AND METHOD FOR OBTAINING COMPENSATED LEVEL MEASUREMENTS

[75] Inventors: Frederick L. Maltby, Jenkintown; David M. Stern, Merion Station, both of Pa.

[73] Assignee: Drexelbrook Controls, Inc., Horsham, Pa.

[21] Appl. No.: 967,683

[22] Filed: Dec. 8, 1978

[51] Int. Cl.³ ............................................. G01F 23/26
[52] U.S. Cl. ................................................. 73/304 C
[58] Field of Search ..................... 73/304 C; 361/284; 324/61 R

[56] References Cited

U.S. PATENT DOCUMENTS

| 2,540,659 | 2/1951 | Giers et al. | 73/304 C |
| 2,918,818 | 12/1959 | Meyer | 73/304 C |
| 3,339,412 | 9/1967 | Maltby | 73/304 C |
| 3,534,606 | 10/1970 | Stamler | 73/304 C |

Primary Examiner—Donald O. Woodiel
Attorney, Agent, or Firm—Woodcock, Washburn, Kurtz, Mackiewicz & Norris

[57] ABSTRACT

A compensated level measuring system is disclosed for measuring the level of the material housed in a vessel, the system incorporating compensation means for compensating for variations in the dielectric constant of the material. A two element measuring system is used, having a first element mounted at a fixed position within the vessel containing the material for obtaining a level signal which is a function of the material level, and a second element maintained within the vessel and always submerged in the material for obtaining a reference signal. Means are provided for adjusting the reference signal so that it can accurately compensate for variations in the level signal which occur independently of the material level. The compensating means is provided either by a mechanical embodiment in which the reference signal is effectively tuned by modifying the position of the reference probe, or electronic means where the effective reference signal is modified by an error function to compensate for errors introduced by changes in the dielectric constant of the material being measured.

26 Claims, 7 Drawing Figures

SYSTEM AND METHOD FOR OBTAINING COMPENSATED LEVEL MEASUREMENTS

REFERENCE TO RELATED CASES

Reference is made to pending applications Ser. Nos. 963,299 and 963,300, filed Nov. 24, 1978 and assigned to the same assignee.

BACKGROUND OF THE INVENTION

This invention lies in the area of systems and methods for making level measurements on homogeneous materials contained by a vessel and, more particularly, two channel systems for providing a compensated level system in an industrial environment.

There are a great variety of industrial applications where it is necessary to have an accurate and reliable material level measuring system for use in industrial vessels. The level measuring system must be adaptable to work reliably in a variety of arduous environments such as exist within such vessels. Accordingly, a premium is placed upon having system designs which provide minimum complexity and maximum reliability and, of course, efficiency in terms of system cost. A widely used basic measuring system is the capacitive system where an electrode is used in combination with the vessel walls, the vertical probe rod or cylinder of the electrode comprising a first electrode and the vessel walls comprising a second or return electrode. This system is driven by a remote electronic unit attached thereto, which provides A.C. driving signals for deriving output signals as a function of the effective capacitance value of the probe. Since this capacitance value reflects the material level, the signal reflects such level. Such capacitive systems require minimum hardware within the vessel. However, they do not inherently compensate for errors due to changes in the dielectric constant of the material or to certain changes in the interface electrodes which form the electrical interface to the material. Additionally, for cases where the measured material within the vessel is non-conductive, the probe to vessel electrode geometry plays a significant role in the functioning of the system. The first step to providing means for compensating systems is the use of a second, or reference probe which is maintained submerged in the material contained by the vessel. Such two probe capacitive level measuring systems achieve a certain independence from variations in the dielectric constant of the material. However, the simple provision of a second reference probe does not eliminate error from the system, and it remains necessary to provide further compensation by adjustment of the reference signal in order to obtain substantially complete independence from variations in the material dielectric constant.

In the following description, the material "level" is defined as a uncompensated level, and is the measured level obtained by the level probe, which is affected by the electrical characteristics of the material. The "compensated level" is the actual level which is a corrected value of the measured level. The compensated level is obtained by separately measuring the electrical characteristics with a reference probe, and using this measured value to compensate the level signal from the level probe.

SUMMARY OF THE INVENTION

It is an object of this invention to provide, in a capacitive level measuring system, an improved means of obtaining a compensated level signal which is substantially independent of variations of dielectric constant of the material contained within the vessel.

It is another object of this invention to provide a compensated level measuring system for measuring the level of material in industrial vessels, the system incorporating a unique means and method of tuning a derived reference signal so as to compensate for errors caused by variations in the dielectric constant of the material.

It is another object of this invention to provide a two probe capacitive level measuring system adapted to provide a compensated level signal which is compensated to adjust for error related to the geometry mismatch of the two probes relative to the inner walls of the industrial vessel.

It is another object of this invention to provide, in an industrial level measuring system utilizing capacitive probes for generating signals, an improved probe which is adapted so that it can be tuned so as to minimize system error which would otherwise be introduced.

It is another object of this invention to provide, in a capacitive probe level measuring system, unique electronic means for compensating a signal derived from a measuring probe within the vessel, which compensation reduces system cost and substantially reduces the system error which would otherwise exist. The electronic means is simple, providing means for optimum tuning by changing only one parameter of the system.

In accordance with the above objects, there is provided an improved industrial level measuring system for measuring the level of a material housed in an industrial vessel, wherein two probes are utilized, structurally separate or structurally composite, the first of such probes being mounted for obtaining a level signal which is a function of the material being measured, the second of said probes being maintained within the vessel and always submerged in the material, for obtaining the reference signal used to modify the level signal, the system also providing means for adjusting the reference signal to compensate for variations thereof which are introduced by the system independently of the level being measured. The means for adjusting the reference signal include a specific mechanical embodiment of the reference probe enabling the reference probe to be rotated so as to be tuned to substantially eliminate error introduced due to the relative difference of the geometrical spacing of the level and reference probes with respect to the vessel. Another embodiment provides for electronic calculator means for calculating a compensated reference signal which is derived so as to reduce the system error introduced by the noncongruent geometry of the reference and level probes. The embodiments illustrated permit use of very simple and low cost probes within the vessel, thereby providing for ruggedness, reliability and decreased expense of the system.

DESCRIPTION OF THE PREFERRED EMBODIMENTS

Figure 1:
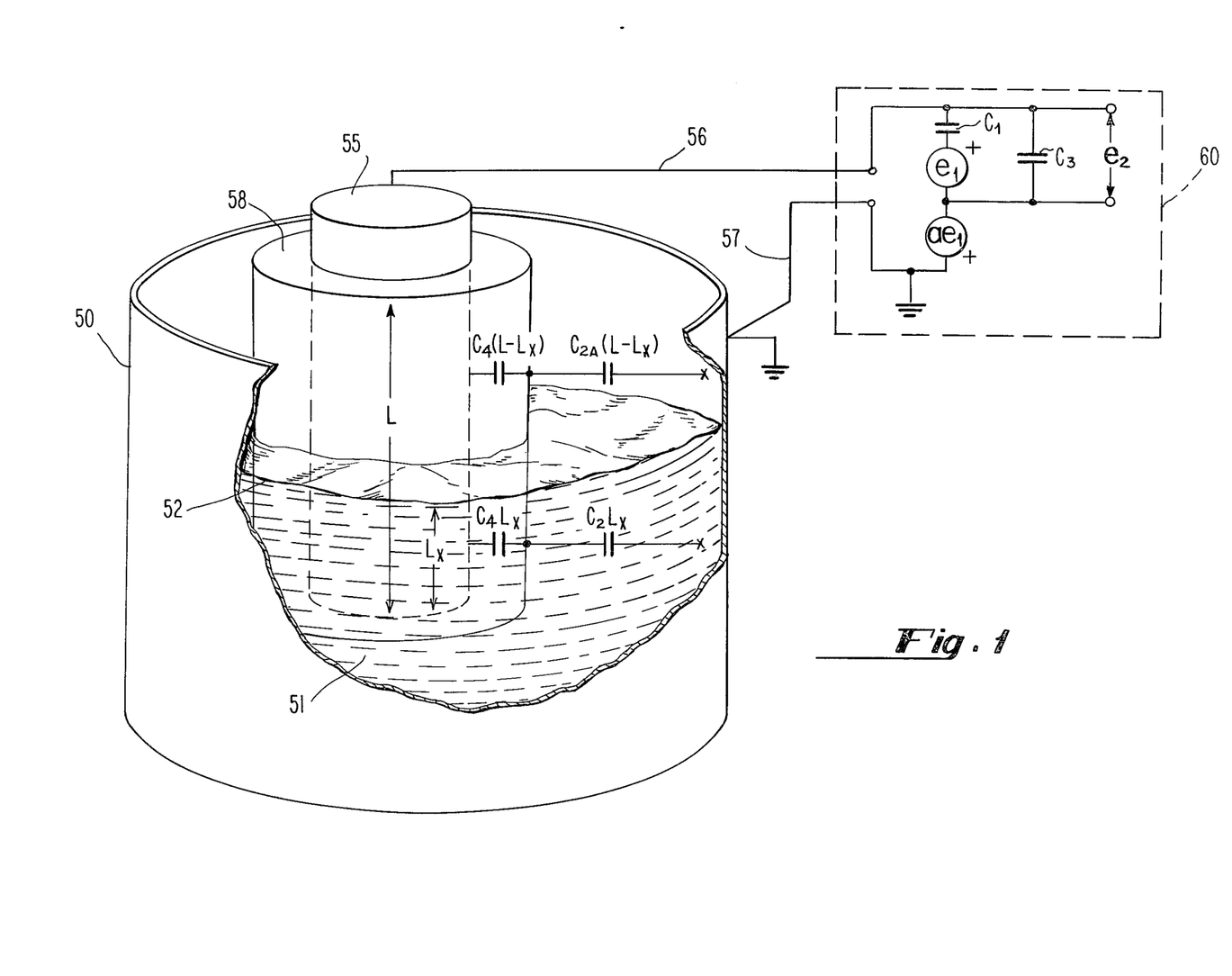
FIG. 1 is a schematic diagram illustrating a conventional probe positioned within an industrial vessel containing material at a given level, the probe being electrically in combination with an electronic unit for deriving a level signal.

In order to understand the embodiments of this disclosure it is necessary to review the mathematical equations which describe the principle and functions of a level measuring system. The analysis proceeds by first determining the governing level measuring equation describing a single insulating probe, and thereafter obtaining a compensated level equation by dividing the level equation by a second similar equation representing the signal derived from the reference probe channel. Referring now to FIG. 1, there is shown a schematic drawing of a basic single channel level measuring system, in conjunction with a circuit diagram representing a measuring circuit 60. Vessel 50 is shown containing a material 51 which has a level of 52. Material 51 may be liquid or non-liquid, and may have almost any degree of conductivity or non-conductivity. Its dielectric constant K may likewise vary over an essentially unlimited range. Illustrated within the vessel and held at a fixed position therein by means not shown is a probe comprising a conducting cylinder or a rod 55 which is electrically connected by a wire 56 to a first terminal of measuring unit 60. The outside surface of conducting element 55 is covered by an insulating coating 58. The probe has a length L, and is immersed beneath level 52 a distance $L_x$. The walls of vessel 50 are made of an electrical conducting material, and are grounded as shown. The walls are electrically connected to a second terminal of measuring unit 60.

Associated with the insulating coating 58 on the probe, there is a distributed capacity $C_4$ (capacitance per foot). That portion of insulating layer 58 which is immersed below level 52 contributes a distributed capacity which is represented schematically as $C_4L_x$, whereas the portion of the insulating layer 58 which is above level 52 contributes a distributed capacity represented as $C_4(L-L_x)$. Likewise, the fluid or material 51 which exists between the outer surface of the probe and beneath level 52, and the interior of vessel wall 50 is represented schematically as $C_2L_x$. At the same time, the effective capacitance between the portion of the probe above level 52 and the inner wall surface, i.e., the space filled with air, is represented by an effective distributed capacitance $C_{2A}(L-L_x)$. It is thus seen that, in circuit terms, between conducting element 55 and the grounded vessel wall there are two capacitance paths in parallel, each of the paths comprising a series combination of two distributed capacitances.

Probe excitation is suitably provided by two AC signal sources $e_1$ and $ae_1$ contained within unit 60. These sources provide A.C. signals, at the same phase and frequency but of amplitudes which differ by the arbitrary constant "a". Considering the electrical circuit which is presented by unit 60 as well as the probe immersed within the vessel 50, the output $e_2$ shown within block 60 can be calculated as a function of the driving amplitude $e_1$, in accordance with the following equation:

$$\frac{e_2}{e_1} = \frac{a \cdot C_{2A} \cdot C_4^2 (K-1) L_x}{C_3(C_{2A} + C_4)(KC_{2A} + C_4)} \quad (1)$$

for $C_3 >> C_1 + C_4L$

The above equation shows that the output signal $e_2$ is linearly related to the material level $L_x$ and is also a function of the dielectric constant K. For the analysis, the distributed capacity $C_2$ is replaced by the product $KC_{2A}$ where $C_{2A}$ is the corresponding air capacity for the assumed geometry and K is the dielectric constant of the material relative to air.

Figure 4:
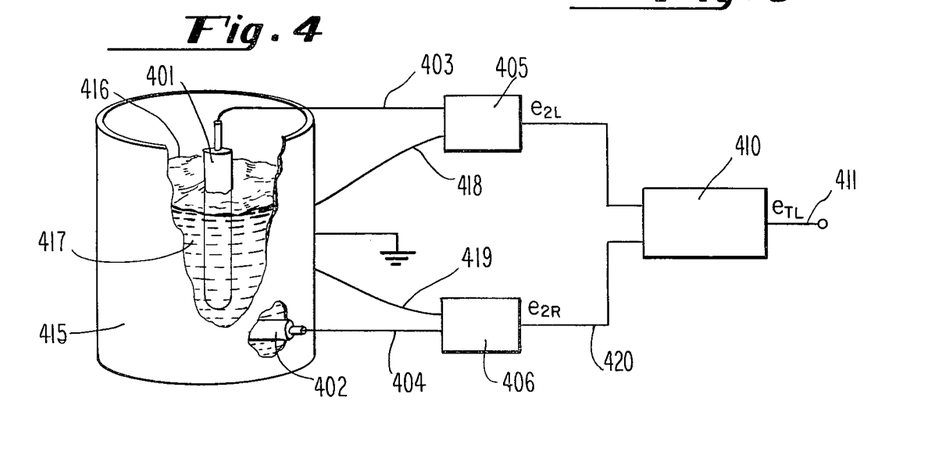
FIG. 4 is a diagram of the primary components of a two probe capacitive compensated level measuring system.

For a conventional compensated level measuring system an output signal $e_{TL}$ representing the level of a material contained within a vessel is implemented essentially by two level measuring systems of the type illustrated in FIG. 1. In addition to a level probe, a reference probe of length Lr is located within the vessel at a fixed position which insures that it is always immersed within the material. Typically, such reference probe is horizontally mounted and may pass through the wall of the vessel, as illustrated in the schematic diagram of FIG. 4. The reference probe may alternatively be suspended from the top of the vessel and be vertically mounted. However, it is a fixed condition that the reference probe always be fully immersed in the material, which means that it must be located in its entirety below the bottom of the level probe. The level and reference probes are each provided with separate electronic units of the type illustrated in block 60 of FIG. 1, which may be considered as units 60L and 60R. The level and reference channel electronic units produce signals $e_{2L}$ and $e_{2R}$ respectively, which are in turn connected to an electronic divider unit which provides an output signal representative of $e_{2L}/e_{2R}$, providing a modified resultant signal designated as $e_{TL}$. Mathematically, the expression for this signal is obtained through the use of equation (1), particularizing for the level and reference channels respectively and letting $L_r$ be the length of the submerged reference channel probe:

$$\frac{e_{2L}}{e_{2R}} = \frac{a_L}{a_R} \cdot \frac{C_{3R}}{C_{3L}} \cdot \frac{(C_{2AR} + C_4)}{(C_{2AL} + C_4)} \cdot \frac{(KC_{2AR} + C_4)L_x}{(KC_{2AL} + C_4)L_r}, \quad (2)$$

where subscript L stands for level channel and subscript R stands for reference channel.

The span of the system is adjusted by arbitrarily setting the ratio of $C_{3R}/C_{3L}$ such that $e_{2L}$ divided by $e_{2R} = 1$ when K is very large and $L_x = L$. Using the thus designated value of the capacitance ratio, equation (2) becomes equation (3) as follows:

$$\frac{e_{2L}}{e_{2R}} = \frac{(KC_{2AR} + C_4)}{(KC_{2AL} + C_4)} \cdot \frac{L_x}{L} \quad (3)$$

In the derivation of equation (3) it is assumed that the capacity value $C_4$ representing the distributed capacity of the probe insulation is the same for the reference and level measuring probes. This can be insured by making the conducting rods of the two probes have equal diameters and by having equal and uniform and non-conducting coatings on the two rods. Additionally, $C_{2AR}$ and $C_{2AL}$ are geometric terms representing the capacity from the probe insulating surface to electrical ground. It is clear that generally $C_{2AR}$ and $C_{2AL}$ will be different values, due to the impossibility of maintaining the two probes at relative positions such that they have identical geometrical relationships to the vessel wall. However, it is seen that if $C_{2AL}$ can be made equal to $C_{2AR}$, then for this special case the ratio of the two resulting probe voltages is equal simply to $L_x/L$ in which case the level measurement becomes independent of the dielectric constant of the material, such that accurate and complete compensation has been achieved. This condition of congruent geometry for the reference and level capacitor probes can be approximated by surrounding each probe with a concentric conducting ground return envelope, or electrode, which is connected to the electrical ground of the system. The required congruent geometry can be obtained in industrial practice by employing coaxial ground electrodes which surround the level and reference probe rods. However, cost considerations or the requirements for maintaining clog-free and contaminant-free conditions in industrial environments often render such specialized geometry structures unacceptable. For this reason, it is often preferable to use probes of non-congruent geometry, and compensate to adjust for the error which is otherwise introduced by such non-congruent geometry.

It is to be noted that instead of having a grounded vessel wall as illustrated in FIG. 1, the vessel wall may be non-conductive or electrically floating, and a ground rod employed. Hereinafter the ground rod arrangement is considered the equivalent of the systems illustrated in FIGS. 1 and 4.

Figure 2:
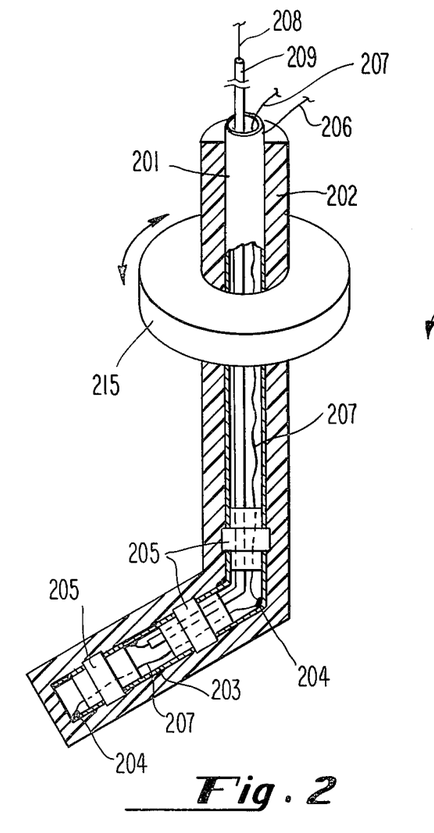
FIG. 2 is a diagrammatic view, partially cut away, of a first embodiment of a composite probe, containing both a level measuring probe and a reference probe, which probe is tunable so as to provide for adjustment of the reference signal relative to the level signal, thereby providing a substantially error free resulting signal which is a compensated level signal.

Referring now to FIG. 2, and keeping in mind that the objective for providing a compensated level value is to functionally have the effective capacity values $C_{2AR}$ and $C_{2AL}$ be equal, there is illustrated an embodiment that substantially achieves this condition.

FIG. 2 shows a cutaway view of a composite probe which comprises both a level probe and a reference probe, combined into a single integrated structure which does not require a coaxial design or any other design which attempts to provide congruent geometry. The single structure of FIG. 2 carries out the functions of the two probes shown in FIG. 4, and as seen from the description immediately following the two probe portions are assembled to provide the same level and reference output signals as seen in the system of FIG. 4. Likewise, the outputs of the two probe portions are coupled to separated electronic units where the $e_{2L}$ and $e_{2R}$ signals are generated. The two signals are then further processed to provide the $e_{TL}$ compensated level output signal.

Referring specifically to the structure of FIG. 2, a conducting tube probe 201, being connected to a corresponding electronic unit by wire 206, in combination with outer insulating layer 202, provides the basic level measuring probe. The principles of operation of this probe and the mounting of same are identical to those previously discussed. Tube portion 201 is oriented vertically. Integrally attached thereto is a lower reference probe tube 203 which is separated from tube 201 by two circular insulating plugs 205 and an intermediate section of the structure. Between these two upper insulating plugs 205 the structure bends, such that tube 203 is at a set angle relative to tube 201. A coaxial cable comprising a wire 208 and outer shell 209 extends through tube 201 and the insulating plugs into tube 203, where wire 208 attaches electrically to the conducting tube. Wire 208 also is connected to a corresponding reference electronic unit. Thus, tube extension 203, which is also surrounded by the insulating coat 202, provides an electrically separate probe, which is used as the reference probe. The effective probe length of tube 203 is defined by a first plug 205 at its upper end and a bottom plug 205 at its lower end. A wire 207 connects to the tube portion 204 at the elbow of the structure, and likewise to a short portion of a conductive tube 203. These tubing sections 204 and 209 are driven by a voltage equal to that which drives the electrodes, thereby isolating the electrode ends from the adjacent electrodes and fringe-field end effects. In other words, the tube sections 204 act to shield probe electrode elements 201 and 203 from spurious capacitive end effects.

A ring 215 is mounted on the probe structure at a position such that it is above the level of the material or fluid, permitting the probe structure to be rotated by turning the ring. As can be seen, rotation of the structure has no effect on the level probe portion, but alters the geometrical relationship of the reference probe portion to the vessel walls.

In operation, the probe assembly of FIG. 2 is mounted within a vessel near a straight wall of the vessel, with the vertical axis of the level probe 201 parallel to the side of the wall. The reference probe portion has a geometrical relationship to the wall of the vessel which is a function of the rotational position of the entire assembly. As is well known, capacitance varies as a function of geometry, capacitance being directly dependent upon the separation distance between the electrodes of the capacitor. Thus, as the probe structure is rotated by rotating ring 215 such that the vertical section remains substantially vertical, the effective distance from reference probe tube 203 to the vessel wall varies from a minimum to a maximum. It is clear that the dominant capacity effect is due to that portion of the vessel wall which lies closest to the probe, such that the capacity increases as the probe is rotated to a position where tube 203 is closer to the vessel walls. Conversely, as the probe is rotated so that tube 203 moves away from the walls, the capacity decreases. This variation in capacity can be used to effectively tune the capacitive contribution designated $C_{2AR}$, the system being tuned when the variable $C_{2AR}$ is made equal to the fixed $C_{2AL}$. There is thus disclosed a single probe structure which achieves the objective of making the level measurement effectively independent of the dielectric, for the reasons as stated above.

It is to be noted that the effective mechanical tuning of the system can be achieved in an alternative manner. Thus, a concentric metallic tube, referenced to ground, can be positioned around the reference probe, and moved along the axis of the reference probe in order to achieve the same type of tuning. Likewise, the level probe may be the probe that is tuned to make the two capacitances which reflect the geometry mismatch appear to be equal. The configuration shown in FIG. 2 is the preferred embodiment, but equivalent structures such as those given by way of example may also be used within the scope of the invention.

Another arrangement, not shown in the drawings, which is an obvious variation of the arrangement of FIG. 2, is to use two separate probes in a system such as illustrated in FIG. 4. In such a configuration, the level probe is a conventional probe such as 401 in FIG. 4. The level probe is thus simply the equivalent of the upper portion of the composite probe of FIG. 2. The reference probe has the same structural geometry as that of the composite probe in FIG. 2, except that the upper portion is simply an inactive probe, only the lower portion which is at an angle to the vertical being active. In such a design, care must be taken to ensure that the active reference probe portion is always fully submersed below the material level. To achieve this, it is a requirement that the reference probe portion be below the bottom tip of the measuring probe.

Figure 3:
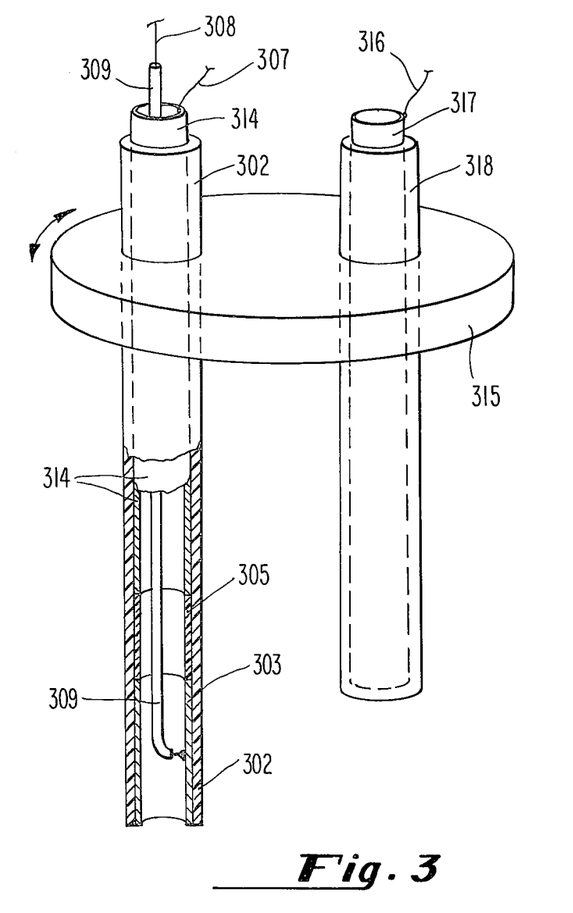
FIG. 3 is a schematic diagram illustrating another embodiment of a probe system having separate level and reference probes which are joined together such that they are rotatable as an integral unit, thereby providing for mechanical tuning of the reference signal relative to the level signal in accordance with the same principle as that of the system of FIG. 2.

Referring now to FIG. 3, there is illustrated another embodiment of the invention, which is a modification of the composite probe of FIG. 2. In the configuration of FIG. 3, the level probe is comprised of tube 317 and insulating layer 318, with wire 316 connecting the probe to the level channel electronic unit. The reference probe is comprised of conducting tube 303 and insulating layer 302. In this embodiment, an inactive tube portion 314, likewise covered by insulating layer 302, extends for a length roughly equal to that of the level probe, and is separated from the reference section by an insulating plug 305. The electronic unit is connected to the reference probe by coaxial cable 309 which carries wire 308, wire 308 being connected to the tube as indicated at a point 304. Wire 308 is also connected to the reference channel electronic unit. Inactive tube 314 is driven with a signal connected through wire 307, as discussed for the inactive portions of the configuration of FIG. 2. As with the configuration of FIG. 2, ground for this system is the vessel wall. The entire reference probe assembly may be rotated by moving ring 315, which integrally joins the two probes. In this case, the probe assembly is mounted near one conducting wall of the vessel and parallel to that wall. As the probe assembly is rotated, the effective air capacitance, or probe to wall capacitance of both the probes is changed. As one increases, the other diminishes, such that together they can be tuned so that $C_{2AR}$ equals $C_{2AL}$.

A number of embodiments have thus been disclosed for providing effective mechanical tuning of the reference probe of a two probe system, so as to compensate for geometry differences between the reference and level probes, thereby enabling the generation of the compensated level signal.

Another means of adjusting the reference signal to compensate for geometry differences, and thereby obtain a compensated level measuring system, is to electronically modify the reference signal. In other words, compensation for variations in the dielectric constant of the material, which variations cause errors due to the geometry mismatch of the two probes, may be accomplished without satisfying the requirement that $C_{2AR}$ equal $C_{2AL}$. In this embodiment, level compensation is obtained through electronic means which permits the system to operate with conventional probe configurations that have a wide difference in the respective geometries of the level and reference channels. The basic arrangement for this embodiment is illustrated in FIG. 4, which shows a vessel 415 containing material 417 up to a level 416. Level probe 401 is connected through wire 403 to level channel electronic unit 405, and reference probe 402 is connected by wire 404 to reference channel electronic unit 406. The vessel wall is system ground and is connected to unit 405 through wire 418 and to unit 406 through wire 419. The outputs of units 405 and 406, being $e_{2L}$ and $e_{2R}$ respectively, are connected to electronic calculator unit 410 which provides electronic compensation, modifying the $e_{2L}/e_{2R}$ signal to obtain a signal representation of the compensated level. Electronic units 405 and 406 are similar to unit 60 as shown in FIG. 1. Two embodiments of unit 410 are illustrated in FIGS. 5 and 6. It is to be understood that a composite probe, such as shown in FIG. 2, may be used in place of the illustrated probes 401 and 402.

In this embodiment, the approach is to modify the reference signal electronically to compensate for effects to the unconstrained geometry of the system. In the system of FIG. 4, $$e_{TL} = e_{2L}/f(e_{2R}) \tag{4}$$

In the above formula, $f(e_{2R})$ is a mathematical function of the $e_{2R}$ variable. As with the prior illustrated embodiments, the reference probe is fully immersed within the material 417, such that any variations in the capacitive constants of the system are represented by a change in the value of $e_{2R}$. Thus, for any given system geometry, i.e., the relationship of the reference probe to the vessel 415, there is a fixed relationship between $e_{2R}$ and the dielectric constant K of the material 417 (assuming homogeneous material).

The relationship between $e_{2L}$ and $e_{2R}$ is repeated as follows:

$$\frac{e_{2L}}{e_{2R}} = \left[ \frac{(KC_{2AR} + C_4)}{(KC_{2AL} + C_4)} \cdot \frac{C_{2AL}}{C_{2AR}} \right] \cdot \frac{L_x}{L} \tag{5}$$

The mathematical quantity within the brackets provides a direct means of evaluating the true level system of this invention. Thus, to the extent that the ratio of the two voltages is not simply a constant times the ratio of $L_x/L$, a system error is introduced due to variation in the dielectric constant K. It is seen that for infinitely large values of K the quantity within the brackets reduces to a value of 1, while for lesser values of K unequal values of $C_{2AR}$ and $C_{2AL}$ result in a coefficient that is not equal to 1. The error, designated $E_{RR}$ is defined by equation (6):

$$E_{RR} = 1 - \left[ \frac{(KC_{2AR} + C_4)}{(KC_{2AR} + C_4)} \cdot \frac{C_{2AL}}{C_{2AR}} \right] \tag{6}$$

It is seen that $E_{RR}$ is defined as the amount by which the coefficient of $L_x/L$ in equation (6) differs from 1, or stating it differently, the amount by which $e_{2L}/e_{2R}$, in the full scale condition ($L_x = L$), differs from its spanned value. Thus, $$E_{RR} = 1 - \frac{e_{2L}}{e_{2R}}\bigg|_{Lx=L}; \quad 1 = \frac{e_{2L}}{e_{2R}(1-E_{RR})}\bigg|_{Lx=L}. \quad (7)$$

As has been observed, the error in the system is introduced due to the fact that the reference signal $e_{2R}$ is not corrected for the geometry mismatch. It is accordingly important to determine the functional relationship of $E_{RR}$ and $e_{2R}$. Examining the reference channel by itself, a mathematical expression providing the signal $e_{2R}$ is obtained from equation (1):

$$\frac{e_{2R}}{e_1} = \frac{a \cdot C_{2AR} \cdot C_4{}^2(K-1)L_r}{C_{3R}(C_{2AR}+C_4)(KC_{2AR}+C_4)} \quad (8)$$

If the reference channel is set so as to produce a value of $e_{2R}/e_1$ of 1 when K has a value of infinity, $C_{3R}$ is fixed with a value such that $$e_{2R}/e_1 = C_{2AR}(K-1)/(KC_{2AR}+C_4) \quad (9)$$

It has been empirically observed that the relation of $E_{RR}$ to the function $(1-e_{2R}/e_1)$ is very nearly linear over the range of K from 2 to infinity. A plot was made of representative sets of values for the parameters shown in equation (9), from which the substantially linear relationship is inferred. Accordingly, a simple function is written to generate the signal $E_{RR}$ from the variable $e_{2R}$ ($e_1$ being a constant of the external circuit). The function thus obtained implements the equation for a straight line with a small correction factor which increases as the slope of the line increases. This function is described by equation (10):

$$E_{RR} = F(1-e_{2R})+|F|G. \quad (10)$$

In the above equation, it is seen that the constant F represents the slope of the function and may be either positive or negative depending upon the sign of the error. The component $|F|G$ represents a positive constant that provides a correction that is effective primarily at intermediate values of K, and represents an error at high values of K. With the factor G selected to be 0.022, the residual error in the true level function at infinite K is about 0.003, for a $C_{2AR}/C_{2AL}$ capacitor mismatch of 20%. For intermediate values of K in the range of 2 to 16, the compensation function reduces the error in the compensated signal to approximately 0.002 for a $C_{2AR}/C_{2AL}$ capacitor mismatch of 20%.

The compensated level function is made explicit as follows:

$$e_{TL} = e_{2L}/e_{2R}(1-E_{RR}) \quad (11)$$

$$e_{TL} = e_{2L}/e_{2R}[1-|F|G-F(1-e_{2R})] \quad (12)$$

$$e_{TL} = e_{2L}/e_{2R}[1-0.022|F|-F(1-e_{2R})] \quad (13)$$

In practice, F is evaluated by making the value of $e_{TL}$ error free at a selected operating point. A significant advantage of this technique is that the system can be calibrated to obtain the desired compensation through adjustment of the single parameter, F. The full calibration procedure for the compensated system is as follows:

(a) Set the F control to ZERO.

(b) With the probes in place, and the vessel empty, independently ZERO the reference and Level channels.

(c) With the vessel filled with water (high value dielectric constant) independently Span the reference channel to 1 (or a multiple thereof).

(d) With the vessel still filled with water (a maximum level for best accuracy), Span the output of the calculator unit, using the Level Channel span control to obtain the signal that corresponds to the water Level within the vessel.

(e) Without disturbing the orientation of the probes, refill the vessel with a material having a relatively low dielectric constant (best accuracy is obtained with a dielectric constant in the range of 2 to 4 and filling to full scale). In this condition adjust the F control to cause the calculator unit to produce the signal that corresponds to the material level within the vessel.

Figures 5A, 5B:
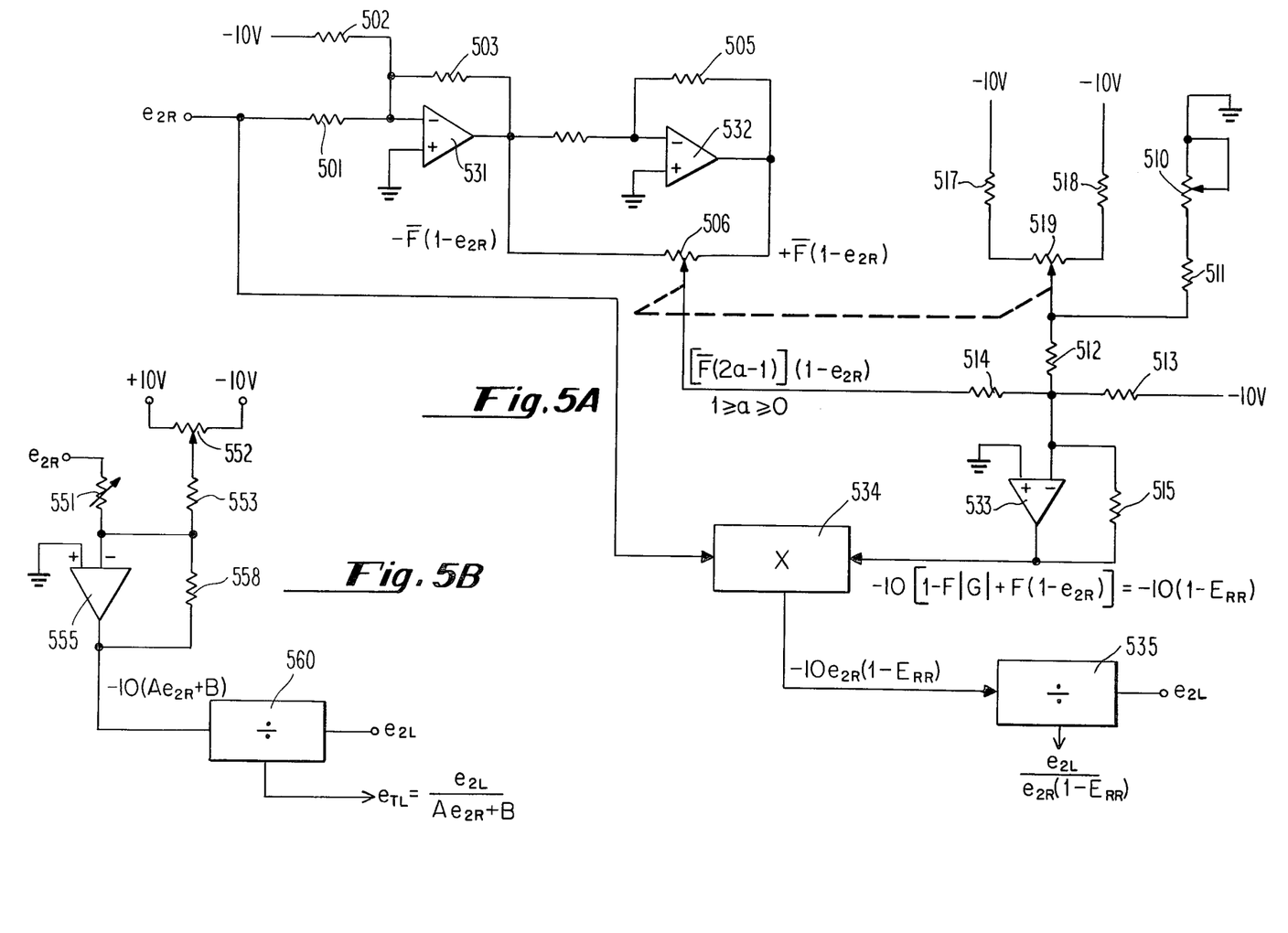
FIG. 5A is a circuit diagram of an analog embodiment of an electronic unit for providing electronic compensation of a reference level signal for the compensated level measuring system of this invention.
FIG. 5B is a circuit diagram of an alternate analog embodiment for providing electronic compensation.
Figure 6:
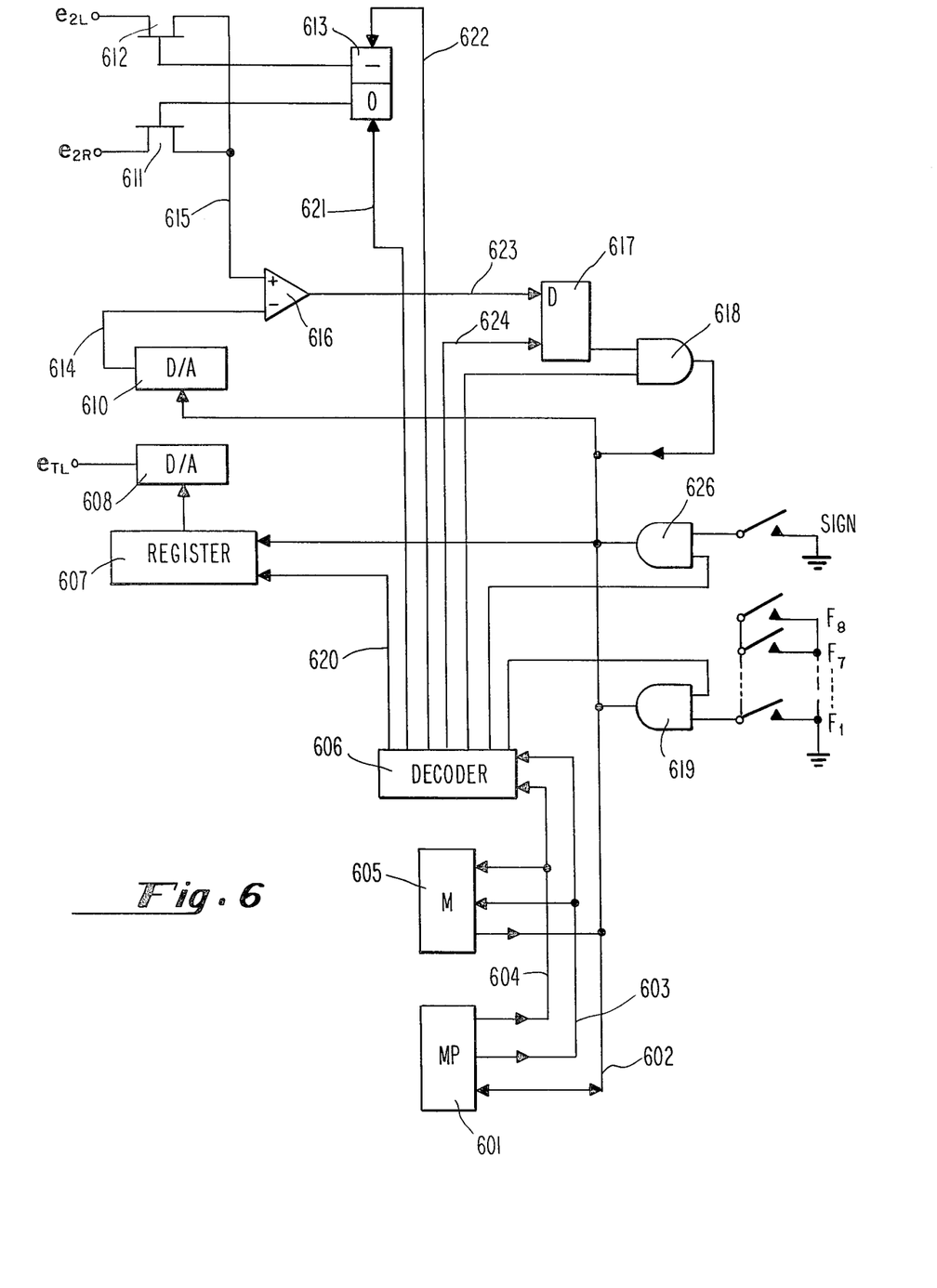
FIG. 6 is a schematic diagram of a digital electronic unit for providing electronic compensation of the reference signal, being a digital equivalent of the analog circuit of FIG. 5.

Referring to FIG. 5A, there is shown an analog circuit embodiment of block 410 of FIG. 4, i.e., the calculating circuit for dividing the level signal by the reference signal and also dividing this function by the correction factor as determined hereinabove. Thus, the circuit of FIG. 5A produces from the final divider block 535 the desired $e_{TL}$ function, as indicated. The circuit of FIG. 5 is suitably constructed with standard available off-the-shelf items, including operational amplifiers such as obtained in integrated circuit type LM741CN, and multiplier and divider circuits obtained from integrated circuit type AD530.

The $e_{2L}$ signal is connected as a first input to divider 535, while the corrected reference signal is provided as a second input. The output of circuit 535, as indicated, is equal to $e_{2L}/e_{2R}(1-E_{RR})$. The $e_{2R}$ signal connects directly to multiplier 534 and is also connected to the input of the operational amplifier 531 and resistors 501, 502 and 503. Resistor 502, which is connected at one end to the junction of resistors 501 and 503, is connected at the other end to a $-10$ volt supply, having the effect of subtracting 1 from the output signal, such that the output is equal to $-\overline{F}(1-e_{2R})$, where $\overline{F}$ has a value of 1 and represents the maximum value that F can assume. The output of amplifier 531 is also fed through the inverter comprising operational amplifier 532 and resistors 504 and 505, to provide $+\overline{F}(1-e_{2R})$. The plus and minus signals are connected across opposite ends of potentiometer 506, which has a variable arm connected to resistor 514, thereby providing the function $$[F(2a-1)] \cdot (1-e_{2R}) \quad (14)$$

where a represents the position of the wiper arm of potentiometer 506. The dual potentiometer 506, 519 provides the single calibration control.

The combination of resistors 510, 511, 517, 518 and 519 are utilized to provide the secondary correction term $|F|G$. Resistors 517 and 518 are each connected to $-10$ volts, while variable resistor 510 is connected to ground. The center arm of pot resistor 519 is mechanically ganged to the center arm of resistor 506, such that they move together. Resistor 517, 518 and 519 form a current sink to draw current provided through resistors 510 and 511. Resistor 510 is adjusted so that when the F factor, (as determined by the potentiometer center arm control for resistors 510 and 519) is set at 0, the current supplied through resistors 510 and 511 balances the current to resistors 517 and 518. However, when the center arm of resistor 519 is moved off center, the parallel impedance of resistors 517, 518 and 519 is reduced such that it draws more current, such that the center arm of resistor 519 (which is tied to resistor 512) goes negative, for whichever way the center arm of 519 is moved. Thus, looking from the node where resistors 512, 513 and 514 are joined, a negative current is sinked through resistor 512, approximately the magnitude function $|F|G$. Resistor 513 is tied to a $-10$ voltage source, and the common node is connected to the input of operational amplifier 533 associated with feedback resistor 515 to sum the currents supplied through resistors 514, 513 and 512. Amplifier 533 provides an output as indicated which is $-10(1-E_{RR})$. This signal in turn provides the second input to multiplier unit 534 whose output represents the corrected denominator, $-10e_{2R}(1-E_{RR})$, of the compensated level function. This signal connects to the denominator input of divider 535 so the desired signal $e_{TL}$ is the output.

It is to be appreciated that other alternate analog implementations of the electronic embodiment may be provided. Thus, it is equally possible to divide the level signal by the reference signal, and divide by the correction factor to produce the compensated level signal. Likewise, other circuit designs can certainly be provided in an equivalent manner for providing the correction signal.

In FIG. 5B there is shown an alternate analog circuit for providing a simplified electronic correction. It is noted that equation (12) involves a non-linear denominator because of the appearance of the square of the reference signal. A simpler and approximate correction factor can be established with a linear denominator term, as follows:

$$E_{TL}=e_{2L}/Ae_{2R}+B \qquad (15)$$

The circuit of FIG. 5B provides $e_{TL}$ in accordance with this simplified formula. The $e_{2R}$ signal is inputted through resistor 551 to the input of amplifier 555. A second input is derived from the wiper arm of potentiometer 552 which is connected between $+10$ volts and $-10$ volts. This output is inputted as the denominator into divider 560, producing the desired output. In practice, this circuit has the B constant set empirically by adjustment of potentiometer 601 and the system is calibrated by adjusting variable resistor 551 to a desired value relative to feedback resistor 558.

FIG. 6 shows another electronic embodiment for compensating the two signals to provide a compensated level signal, which embodiment utilizes a digital microprocessor. Basically, the microprocessor is programmed to provide an analog to digital conversion of the $e_{2L}$ and $e_{2R}$ signals, which digital values are then processed in a conventional manner to generate the error function and to then generate the final compensated level signal in accordance with the equations set forth above.

In the embodiment of FIG. 6 a microprocessor 601 is connected to an 8 bit address bus 604, a strobe bus 603, and a bidirectional data bus 602. Also connected to these busses is a ROM memory integrated circuit 605. A decoder circuit 606 is driven by the address bus 604 and is strobed by the signal on bus 603. The decoder circuit decodes 7 unique addresses from the 256 word address space of the microprocessor to provide at its output 7 separate control lines which are individually pulsed upon receipt of the appropriate address. Register 607 receives and stores 8 bits of data from the data bus when selected by the decoder signal 620. The register in turn drives digital to analog converter element 608 which produces a DC voltage $e_{TL}$ in direct proportion to the number stored in register 607. The $e_{TL}$ signal represents the compensated level signal.

Field effect transistors 611 and 612 are employed as analog gating elements to select either the $e_{2L}$ or $e_{2R}$ signal onto the common bus 615. Selection of signal $e_{2L}$ or $e_{2R}$ is controlled by the state of flip-flop element 613 which in turn is switched by control lines 621 and 622, which are driven by the decoding action of element 606. The analog bus 615 provides one of two signal inputs to voltage comparator element 616. The second comparator input is provided by the output voltage signal from D/A converter circuit 610. The output signal from the comparator is carried on conductor 623 to the D type flip-flop 617, which is gated by decoder line 624. The action of the D flip-flop circuit is that its output assumes the state that exists on the input conductor 623 during the time that it is gated by a decoder signal on line 624. When the gating signal is removed the D flip-flop remains in its last state. Open collector gate element 618 permits the state of the flip-flop 617 to be placed on the most significant bit (MSB) line of data buss 602. This signal transfer takes place when the appropriate address is received by the decoder 606.

Elements 610, 616, 617 and 618 operate in conjunction with the programmed action of the microprocessor 601 to produce analog to digital conversions of the analog signal gated onto analog bus wire 615. The conversion action is effected by the well known sequence of "successive approximation" steps. For this technique the converter 610 is first driven with a number corresponding to half scale (MSB only). Noting that converter 610 is always active, the address bus is available to provide an enabling signal to flip-flop 617. Thus, this flip-flop assumes and stores the state indicating whether the comparator sensed the half scale condition to be greater or less than the incoming analog signal. In the succeeding programmed steps the processor 601 reads in the state of the most significant bit of the data bus. The program then executes a conditional branch on this state. If the analog signal is found to be greater than the signal provided by 610 the converter is then next driven by a binary signal consisting of the last driving signal plus a one in the next most significant bit position. The test is then repeated as described above. If the comparator signal had indicated that the converter signal exceeded the incoming analog signal the conditional program branch would be to a sequence of steps which removes the last trial bit ONE state from its corresponding bit position (MSB for the first try). That portion would then become a ZERO and a ONE would be tried in the next lowest significant bit position. This test process is repeated 8 times to establish the state of all 8 bits driving the converter 610. At the completion of the 8 tests the remaining word driving the converter represents the 8 bit binary conversion of the incoming analog signal.

For each compensated level signal computation two conversions are required, once for the level signal and once for the reference signal. The microprocessor 601 contains several auxiliary registers which permit temporary storage of the binary representation of $e_{2R}$ and $e_{2L}$. The computation of the required compensated level signal proceeds under program control in the manner as dictated by equation (13). The values 1 and G (0.022) required by the equation are embedded within the program which is contained in the ROM memory 605. The value of the variable F is loaded from 9 switches in two successive read operations. The nine switches provide magnitude and sign for the parameter F. Alternatively the data for F can be provided by pots which provide an analog signal that can be entered through the analog conversion process.

After the internal computations have been completed by the microprocessor the result is transmitted as an 8 bit binary word to the register 607. The register in turn updates the continuous running D/A converter which provides the analog signal representation of the $e_{TL}$ value.

From the above it is seen that several different embodiments have been shown for adjusting or tuning the system so that the reference level signal is effectively compensated for changes of the dielectric constant of the material and for mismatches in the relative geometry of the two probes with the vessel. Compensation can be provided by either mechanical or electrical tuning, as has been demonstrated. For mechanical tuning, the embodiments provide the advantage that the probe system need only be rotated, which is a relatively easy adjustment, there being no requirement of otherwise modifying the probe structure. Likewise, for the electronic tuning, it is necessary only to adjust a single factor (F) to provide the effective geometry compensation. While a number of embodiments of the invention have been presented, it is to be understood that additional equivalent embodiments may be designed incorporating the essential features of the invention, and which are within the scope of the invention as claimed.

We claim:

1. A compensated level measuring system for measuring the level of material housed in a vessel, said material being characterized by certain electrical characteristics such as dielectric constant and conductivity, comprising:
   a. first probe means having a first probe portion mounted at a fixed position within said vessel, for obtaining a level signal which is a function of said material level and said electrical characteristics;
   b. second probe means having a second probe portion maintained within said vessel at a position always submerged in said material, for obtaining a reference signal which is a function of said electrical characteristics;
   c. said second probe means comprising means located external to said second probe portion and operable while said second probe portion is submerged in said material for adjusting said reference signal to provide a compensated reference signal;
   d. means for deriving a compensated level signal as a predetermined function of said level signal and said compensated reference signal; and
   e. wherein said first probe means comprises a first electronic source circuit in combination with said first probe portion for generating said level signal, and said second probe means comprises a second electronic source circuit in combination with said second probe portion for generating said reference signal.

2. The compensated level measuring system as described in claim 1, wherein said first and second probes have non-congruent geometrical relationships with said vessel.

3. The compensated level measuring system as described in claim 1, wherein said first and second probe portions are housed in a composite probe element.

4. The compensated level measuring system as described in claim 1, wherein said first and second probe portions are housed in respective separate probe housings.

5. The compensated level measuring system as described in claim 1, wherein said adjusting means comprises means for mechanically changing the geometrical relationship of said second probe portion with system ground.

6. The compensated level measuring system as described in claim 5, wherein said second probe means comprises a reference housing for maintaining said second probe portion at an angle to the vertical, and means for rotating said angled second probe portion about a substantially vertical axis.

7. The compensated level measuring system as described in claim 5, comprising housing for maintaining said first and second probe portions in vertical positions, and means for adjusting said portions to have different geometrical relationships to said vessel.

8. The compensated level measuring system as described in claim 5, comprising housing for maintaining said second probe portion below said first probe portion.

9. The compensated level measuring system as described in claim 5, wherein said vessel has walls which are at A.C. electrical ground, and wherein said mechanical adjusting means comprises means for adjusting the effective capacitance between said second probe portion and said system ground.

10. The compensated level measuring system as described in claim 9, wherein said capacitance adjusting means comprises means for rotating said second portion so as to vary its distance from said vessel walls.

11. The compensated level measuring system as described in claim 1, wherein said means for adjusting comprises an electronic compensating circuit for compensating said reference signal.

12. The compensated level measuring system as described in claim 11, wherein said electronic circuit compensates said reference signal by a linear factor.

13. The compensated level measuring system as described in claim 11, wherein said electronic compensating circuit is an analog circuit.

14. The compensated level measuring system as described in claim 11, wherein said electronic compensating circuit is a digital circuit.

15. The compensated level measuring system as described in claim 14, wherein said digital circuit comprises a microprocessor unit.

16. The compensated level measuring system as described in claim 11, wherein said electronic circuit compensates said reference signal by a factor designated by the mathematical formula $[1-G|F|-F(1-e_{2R})]$.

17. The compensated level measuring system as described in claim 16, wherein said tuning circuit has a single calibration control for adjusting F.

18. The compensated level measuring system as described in claim 1, wherein said adjusting means provides for adjusting said second probe portion relative to said first probe portion such that the air capacity per unit length parameter of said first probe portion is substantially equal to the air capacity per unit length parameter of said second probe portion.

19. The compensated level measuring system as described in claim 11, wherein said electronic circuit compensates said reference signal by a factor which is a predetermined function of said reference signal.

20. A compensated level measuring system for measuring the level of a material housed in a vessel having walls, said material having electrical characteristics including a dielectric constant K which may vary during usage of said system, comprising:
- a level probe assembly comprising a level probe mounted at a fixed position within said vessel in combination with a level electronic source circuit, for generating a level signal which is a function of said level;
- a reference probe assembly comprising a reference probe always submersed in such material, in combination with a reference electronic source circuit, for generating a reference signal; and
- means for adjusting the position of said reference probe, whereby said probes can be geometrically matched.

21. The compensated level measuring system as described in claim 20, wherein said reference probe assembly comprises a housing comprising a first portion maintained vertically within said housing and a second portion maintained at a fixed angle relative to said first portion, said second portion housing said reference probe, and means for rotating said first portion such that the effective geometrical position of said second portion relative to the vessel walls is changed while the effective geometrical position of said first portion relative to said vessel walls is unchanged.

22. The compensated level measuring system as described in claim 20, comprising an element for holding said level probe assembly and said reference probe assembly in fixed geometrical relationship with each other, and wherein said adjusting means comprises means for changing the respective geometrical positions of said level and reference probe assemblies relative to said vessel walls.

23. A compensated level measuring system for measuring the level of a material housed in a vessel, said material having a dielectric constant K which may vary during usage of said system, comprising:
- a level probe assembly comprising a level probe mounted at a fixed position within said vessel in combination with a level electronic source circuit, for generating a level signal which is a function of said level;
- a reference probe assembly comprising a reference probe submerged in said material, in combination with a reference electronic source circuit, for generating a reference signal; and
- electronic compensating means for compensating said generated reference signal in accordance with a predetermined function, and for deriving a compensated level signal as a predetermined function of said level signal and said compensated reference signal.

24. The compensated level measuring system as described in claim 23, wherein said electronic compensating means comprises an analog circuit.

25. The compensated level measuring system as described in claim 23, wherein said electronic compensating means comprises a digital circuit.

26. The compensated level measuring system as described in claim 23, wherein said electronic compensating means compensates said reference signal by a factor which is a predetermined function of said reference signal.

UNITED STATES PATENT AND TRADEMARK OFFICE
CERTIFICATE OF CORRECTION

PATENT NO. : 4,235,106
DATED : November 25, 1980
INVENTOR(S) : Maltby et al.

It is certified that error appears in the above-identified patent and that said Letters Patent are hereby corrected as shown below:

Column 2, line 39, after "material" insert -- level --.

Column 5, lines 4 and 5 (equation 3), change

"$\dfrac{e_{2L}}{e_{2R}} = \dfrac{(KC_{2AR}+C_4)}{(KC_{2AL}+C_4)} \cdot \dfrac{L_x}{L}$" to -- $\dfrac{e_{2L}}{e_{2R}} = \dfrac{(KC_{2AR}+C_4)}{(KC_{2AL}+C_4)} \cdot \dfrac{C_{2AL}}{C_{2AR}} \cdot \dfrac{L_x}{L}$ --

Column 7, line 57, change "the" to (2nd occurrence) to -- a --.

Column 11, line 14, after "(" delete "-".

*Signed and Sealed this*

*Thirty-first* Day of *March 1981*

[SEAL]

Attest:

RENE D. TEGTMEYER

*Attesting Officer*   *Acting Commissioner of Patents and Trademarks*